United States Patent
Nielsen

(10) Patent No.: US 7,680,689 B2
(45) Date of Patent: Mar. 16, 2010

(54) SELF-SERVICE TERMINALS AND SELF-SERVICE NETWORKS

(75) Inventor: Paul Nielsen, St. Andrews (GB)

(73) Assignee: NCR Corporation, Dayton, OH (US)

( * ) Notice: Subject to any disclaimer, the term of this patent is extended or adjusted under 35 U.S.C. 154(b) by 2912 days.

(21) Appl. No.: 09/966,026

(22) Filed: Sep. 28, 2001

(65) Prior Publication Data

US 2002/0046119 A1    Apr. 18, 2002

(30) Foreign Application Priority Data

Oct. 18, 2000    (GB)    .................... 0025571.1

(51) Int. Cl.
*G06Q 30/00*    (2006.01)
(52) U.S. Cl. .............. 705/14.43; 705/14.13; 705/14.23; 705/14.37; 705/14.41; 705/14.61; 235/379
(58) Field of Classification Search ............... 705/14, 705/14.13, 14.23, 14.37, 14.41, 14.43, 14.61; 235/379
See application file for complete search history.

(56) References Cited

U.S. PATENT DOCUMENTS 6,073,727 A * 6/2000 DiFranza et al. ............ 187/396
6,571,279 B1 * 5/2003 Herz et al. ................. 709/217
6,970,846 B1 * 11/2005 Drummond et al. .......... 705/43

FOREIGN PATENT DOCUMENTS

| EP | 1091328 | 4/2001 |
|----|---------|--------|
| WO | 0005670 | 2/2000 |
| WO | 0065504 | 11/2000 |
| WO | 0075889 | 12/2000 |

OTHER PUBLICATIONS

Calvey, Mark. "For Banks, ATM advertising could be right on the money." San Francisco Business Times, 1996.*

* cited by examiner

*Primary Examiner*—Eric W Stamber
*Assistant Examiner*—Tri V Nguyen
(74) *Attorney, Agent, or Firm*—Gregory A. Welts

(57) ABSTRACT

An ATM network is coupled to a data warehouse. Information about transactions, the timing of transactions and advertisements displayed on or near ATM terminals in the network are stored in the data warehouse. Complex queries performed on the data warehouse are then used to provide information about the effectiveness of advertisements displayed on or near the ATM terminals and also to enable choices of subsets of the terminals to be made to provide information about suitable subsets for advertising placement.

8 Claims, 5 Drawing Sheets

SELF-SERVICE TERMINALS AND SELF-SERVICE NETWORKS

BACKGROUND OF THE INVENTION

This invention relates to methods of analyzing a self-service network, selecting advertisements for self-service terminals, to a data warehouse and to a self-service terminal.

As self-service terminals such as automated teller machines (ATM) become more sophisticated, an opportunity is provided for displaying increasingly sophisticated advertisements on (or adjacent) the ATM. For example, self-service ATMs increasingly are able to display fill motion video and Internet content in addition to being able to print information. Thus, during the time taken to authorize a transaction (which is typically of the order of a few and maybe several tens of seconds) advertisements may be displayed on the terminal display means or printed during and/or after a transaction. Such advertisements may generate revenue to support the cost of providing the ATM network.

In common with other advertising media such as radio and television, it is necessary to survey the effect of the advertisement in order to select appropriate advertisements and also to provide potential advertisers with information on which to make their placement decisions.

Presently, a few organizations collect information from ATM deployers about their ATM fleets, aggregate it and produce anonymized reports outlining trends and statistics in the use of self-service ATM terminals. However, this type of report is prepared manually and thus there is a time lapse of weeks or months between data gathering and report finalization and furthermore, there is no possibility of re-defining the way the report is presented such as by performing personalized queries on the data. Also, the reports are prepared based on a plurality of deployer's ATM fleets and thus do not relate to a particular fleet. Thus such reports are not suitable for selecting advertising content to be displayed on ATM self-service terminals.

SUMMARY OF THE INVENTION

In accordance with the invention there is provided a method of selecting advertisements for display on and/or adjacent to a plurality of self-service terminals comprising the steps of:—

(a) collecting environment data related to the environment of each terminal such as its location and/or the nature of businesses nearby the terminal, (b) collecting transaction data related to the type and time of transactions carried out at the terminal, and/or (c) collecting advertising data related to the type and content of one or more advertisement displayed on and/or adjacent to the terminal at particular times, and (d) storing the collected data in a data warehouse.

In will be appreciated that "display" in this context includes display on a device such as a CRT and also printing on media such as paper, under control of the ATM.

Preferably, the plurality of terminals is distributed across more than one deployer network. The data is preferably collected and stored in real time as this allows queries to be produced on up to date data.

It will be appreciated that in order to optimize communication costs, a terminal may not have a "permanently on" connection to the network. For example, the connection to the network may be achieved using a dial up cellular telephone connection. Such a connection is periodically initiated and data uploaded or downloaded as required. Thus, the term "real time" encompasses such a situation in which the data is stored and collected in "near real time" i.e. possibly with a lag of a few hours.

Preferably the method includes querying the data warehouse to determine the relationship between the effectiveness of an advertisement and the terminal on or adjacent which it is displayed. For example, this may be achieved by determining how often the display of an advertisement on or adjacent a terminal is substantially coincident with a transaction which is related to the advertising content, being initiated by a user at the terminal For example, in a terminal which is operable to print tickets for admission to an event, an advertisement for the event may be displayed by the terminal. Thus the data warehouse may be queried to determine how frequently the display of the advertisement for the event results in tickets for the event being sold via the terminal.

Preferably, the data warehouse may be queried to determine which terminals are located on sites at which a selected business activity is carried out and an advertisement may then be selected for display which includes content related to that business activity.

For example, the data warehouse may be queried to identify all terminals located in a particular airport and travel-related (for example from an airline) advertising material may be displayed on those terminals.

Typically, the method includes the steps of querying the data warehouse to calculate a statistical distribution of the frequency of different transactions occurring at a terminal and then selecting an advertisement for display at the terminal dependent on the statistical distribution.

For example, a terminal may be operable to print a map showing the location of an entertainment event occurring near the terminal. Having calculated the statistical distribution of the transactions at that terminal, it is possible to see if a statistically significant number of users are requesting the map. It may then be appropriate to present advertising material related to the event shown on the map (to generate more requests for the map and therefore more interest in the event) or even to advertise an event of a related type (for example to sporting or tourist activities). The related event may be operated by the same company as that for which the map is printed.

According to a second aspect, there is provided a data warehouse operable to receive data from a network of self-service terminals comprising:

(a) means for holding environment data related to the environment of each terminal such as its location and/or the nature of a business nearby the terminal, (b) means for holding transaction data related to the type and time of transactions carried out at the terminal, and/or (c) means for holding advertising data related to the type and content of one or more advertisement displayed on and/or adjacent to the terminal at particular times, and the data warehouse being operable to provide information in real time or near real time for selecting advertisements for display on and/or adjacent to one or more of the plurality of self-service terminals.

According to a third aspect there is provided a self service terminal comprising display means operable to display advertising material and network connection means for coupling the terminal to a self-service terminal network, the terminal being arranged to receive commands from the network which determine what advertising content is to be displayed on the display means and at what time, the terminal being further arranged to send information to the network which identifies which transactions are occurring at the terminal and at what time they occur.

According to a second method aspect, there is provided a method of analyzing a self service terminal network comprising the steps of:—

(a) providing database means operable to hold data related to transactions performed by a terminal in the network and advertising content displayed on and/or adjacent the terminal substantially at the time of the transaction, (b) gathering terminal data from terminals in the network which is related to transactions performed by each terminal in the network and respective advertising content displayed on and/or adjacent each terminal, (c) entering the terminal data into the database means, and (d) analyzing the terminal network by querying the data in the database means.

The term "self-service apparatus" is used herein to refer to unattended apparatus which may receive user input and/or provide information to a user, for example about a bank account. Such self-service apparatus (or terminal) may also be arranged to allow a user to initiate and/or complete transactions such as purchasing items or withdrawing money from a bank account, whilst being unattended by anyone other than the user. Examples of selfservice apparatus include automated teller machines (ATM), vending machines and non-cash kiosks with touch screen displays. Another example is a web-enabled, interactive display forming an integral part of a fuel dispensing pump in an automotive fuel station.

The term "deployer" is used herein to refer to an owner or controller of a plurality (fleet) of self-service terminals.

Actions or processes that are initiated and completed instantaneously after the occurrence of one or more trigger events are said to be completed in "real time". For example, many ATMs in current usage operate to update bank account details using on-line transaction processing (OLTP) which is substantially real time. In contrast, batch processing, which often involves manual input of data into a computer system, for example, at the end of each working day, is not "real time". In batch processing, trigger events such as bank account transactions occur during the working day, but actions or processes to log these transactions in a central computer system only occur once a plurality of trigger events have accumulated. For example, this may be at the end of each day. An advantage of this is that processing a batch of items is often more computationally efficient and the processing can take place at "non-busy" times. A continuum can then be thought of with batch processing at one end of the continuum and real time processing at the other end of the continuum. The term "near real time" is used to refer to processing that is not strictly real time, but which is closer to the real time end of the continuum than the batch processing end of the continuum.

The term "kiosk" is used herein to refer to a type of self-service apparatus which does not operate using cash.

The term "data warehouse" is used to refer to a storage means which is able to store data in such a manner that it is easily and quickly accessible in real time. A data warehouse is also operable to perform complex pattern analysis of the data.

BRIEF DESCRIPTION OF THE DRAWINGS

The invention will now be described by way of example with reference to the drawings in which:—

DETAILED DESCRIPTION

Figure 1:
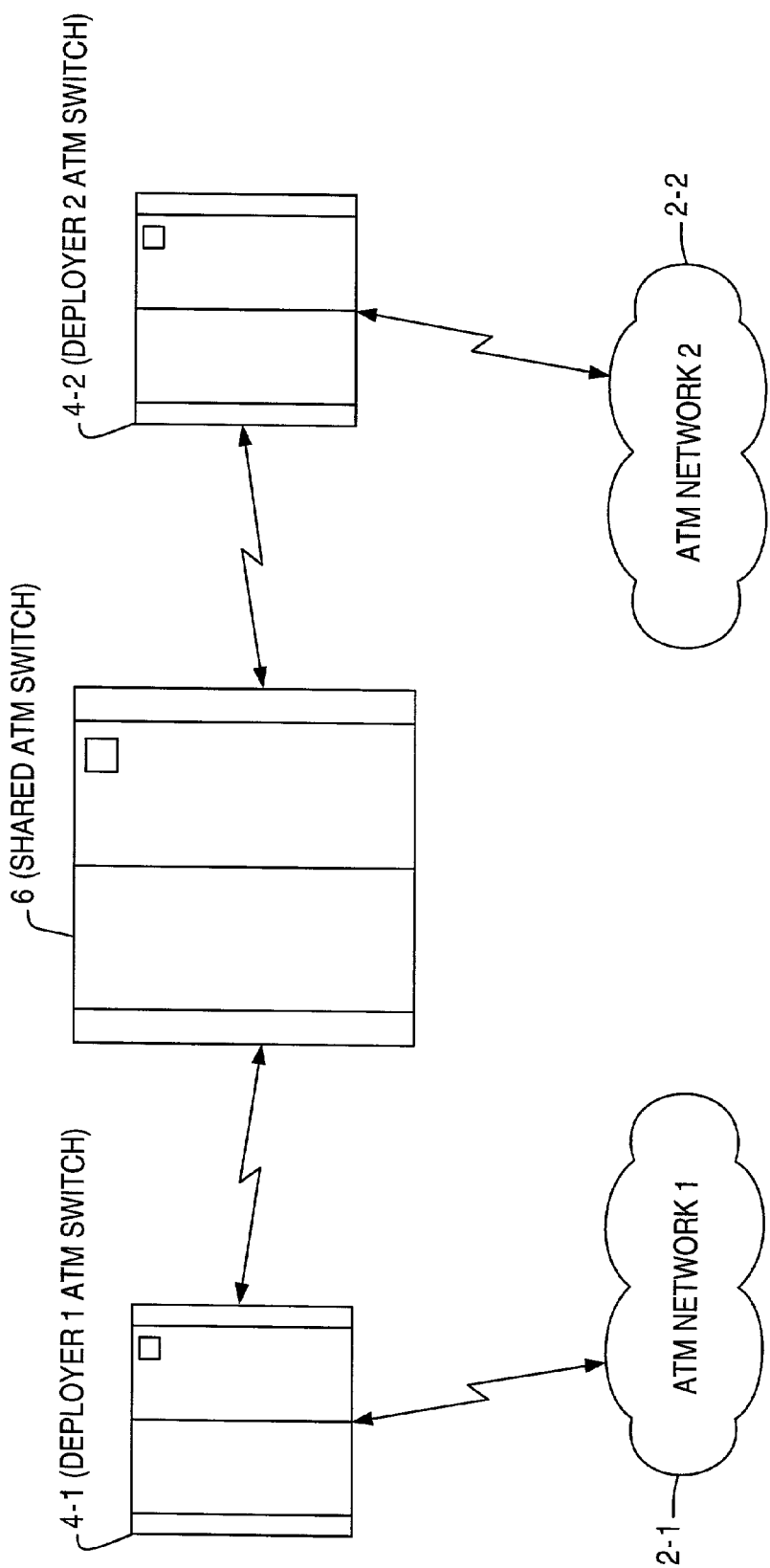
FIG. 1 is a schematic diagram of an ATM network containing two ATM deployer fleets.

With reference to FIG. 1, a first ATM network 2-1 comprises a plurality of ATMs (not shown) communicatively coupled to a first ATM switch 4-1.

The network 2-1 is associated with a first deployer which may, for example, be a particular issuer bank.

Similarly, a second deployer has an ATM network 2-2 communicatively coupled to a second ATM switch 4-2. The two switches 4-1 and 4-2 are interconnected via a shared ATM switch 6. Thus, a customer of deployer 1 can use the second ATM network 2-2 since transaction requests are passed via deployer two ATM switch 4-2 and shared ATM switch 6 to the customer's own ATM network 2-1. It will be appreciated that the network represented in this figure is much simplified. In practice there are likely to be many shared switches, deployer switches and/or deployer networks.

The arrangement of FIG. 1 allows transactions to be processed successfully between different deployer fleets. However, this arrangement does not make it easy to make decisions concerning or assess the impact of advertisements displayed on the ATM terminals within the networks 2-1 and 2-2.

Figure 2:
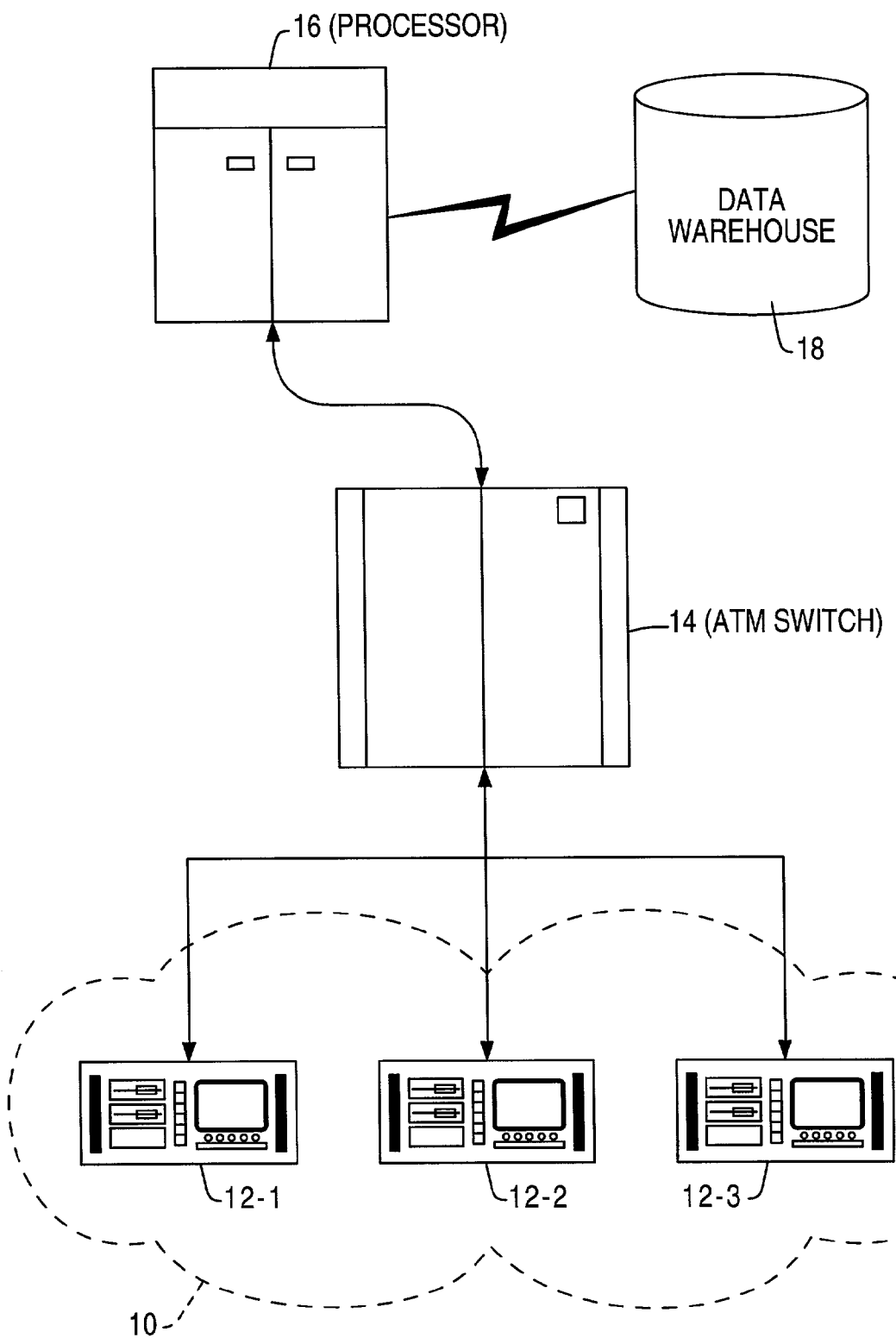
FIG. 2 is a schematic block diagram of an ATM network coupled to a data warehouse.

To overcome this, the structure of FIG. 2 is used. An ATM network 10 (which may be from a single deployer or typically from a plurality of deployers), contains ATM terminals 12-1, 12-2 and 12-3. These are coupled via an ATM switch 14 (which may designate a single deployer ATM switch such as 4-1 or 4-2 above or the combined effect of individual deployers ATM switches coupled via a shared ATM switch such as the switch 6), to a 10 processor 16 operable to process information stored in a data warehouse 18.

The data warehouse 18 may for example be a Teradata (trade mark) data warehouse which allows large volumes of data to be stored and for complex queries to be executed. It will be appreciated that the data warehouse 18 may physically be a plurality of distributed databases which typically would be logically associated into one or more data warehouse.

The configuration of FIG. 2 allows information about the use of the ATM terminals to be provided to deployers considerably more rapidly than the manual survey techniques used in the prior art. Furthermore, depending on the commercial relationship between a deployer and the data warehouse operator, a deployer may choose which analyses are performed on the ATM terminals in the network 10.

Figure 3:
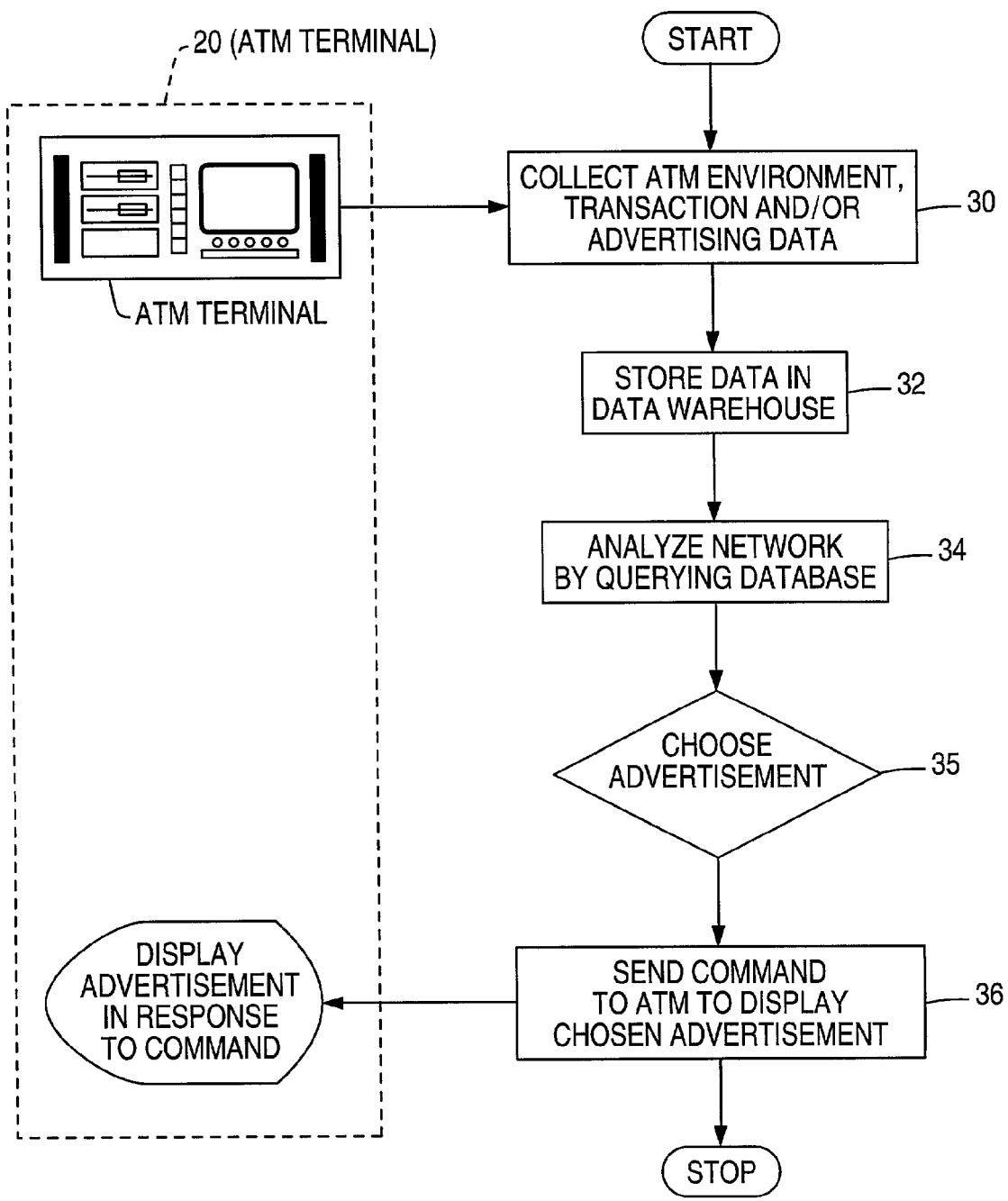
FIG. 3 is a flow chart showing the use of the data warehouse in accordance with the invention to select an advertisement.

For example, with reference to FIG. 3, an ATM terminal 20 is configured to provide information about its operation to the processor 16 via the ATM switch 14. The processor 16 collects information from the ATM terminal (step 30). The information may for example be environment information such as the location of the ATM and the nature of businesses near to the ATM location. In an alternative embodiment, this environment information will be obtained from a separate static database (not shown) rather than being stored in the ATM and accessed via the ATM network. Such a database may include, for example, weather forecasts sourced from a third party such as a local meteorological office.

The ATM information includes transaction information typically including the type of transaction and time the transaction is carried out at the ATM since information was last collected.

Furthermore, the information may include advertising data such as advertisements displayed on display means of the ATM terminal before, during and after a transaction. The advertising data may also include information relating to static adverts such as those adhesively secured to the terminal or located on a adjacent housings or buildings. Such information about static advertisements may be obtained from data sources other than the ATM terminal 20.

This data is then stored in the data warehouse 18 (step 32). The database in the data warehouse is then queried (step 34) to provide information to enable suitable advertisements to be chosen (step 35). Because the database is implemented in a data warehousing system, such as a Teradata (Trade Mark) warehousing system, very complex and far-reaching queries can be used to analyze the information in the database. These queries are typically carried out in a standard database query language, such as the Structured Query Language (SQL), put forth by ANSI (the American National Standards Institute).

One example of the type of query that might be run is one that searches for all ATM terminals in the network that are within a selected distance of a certain venue (e.g., a sports arena) and that tend to experience a certain amount of traffic within 30 minutes of the typical start-time for events at that venue. For any ATM that meets the search criteria, the network administrator (typically associated with a network deployer) might instruct the ATM to advertise a similar event at another venue each time a customer withdraws cash at the ATM within 30 minutes of the start-time.

Another example of the type of query that might be run is one that discerns, for an ATM terminal at a branch location of a bank, what percentage of ATM customers use the bank's investment-brokerage services. If the percentage of brokerage customers exceeds some minimum value (perhaps indicating wealth in the surrounding community), the administrator might instruct the ATM terminal to advertise those services every time a customer withdraws or deposits a relatively large amount of money at the terminal. A subsequent query might be used to determine how many of those customers later established a brokerage account with the bank and thus to conclude how successful the advertisements have been.

Having chosen an advertisement, the processor 16 commands the ATM terminal 20 to display the selected advertisement.

It will be appreciated that these steps need not be carried out for each single advertisement Instead, a table which maps particular advertisements to particular transactions may be downloaded to an ATM terminal.

Figure 4:
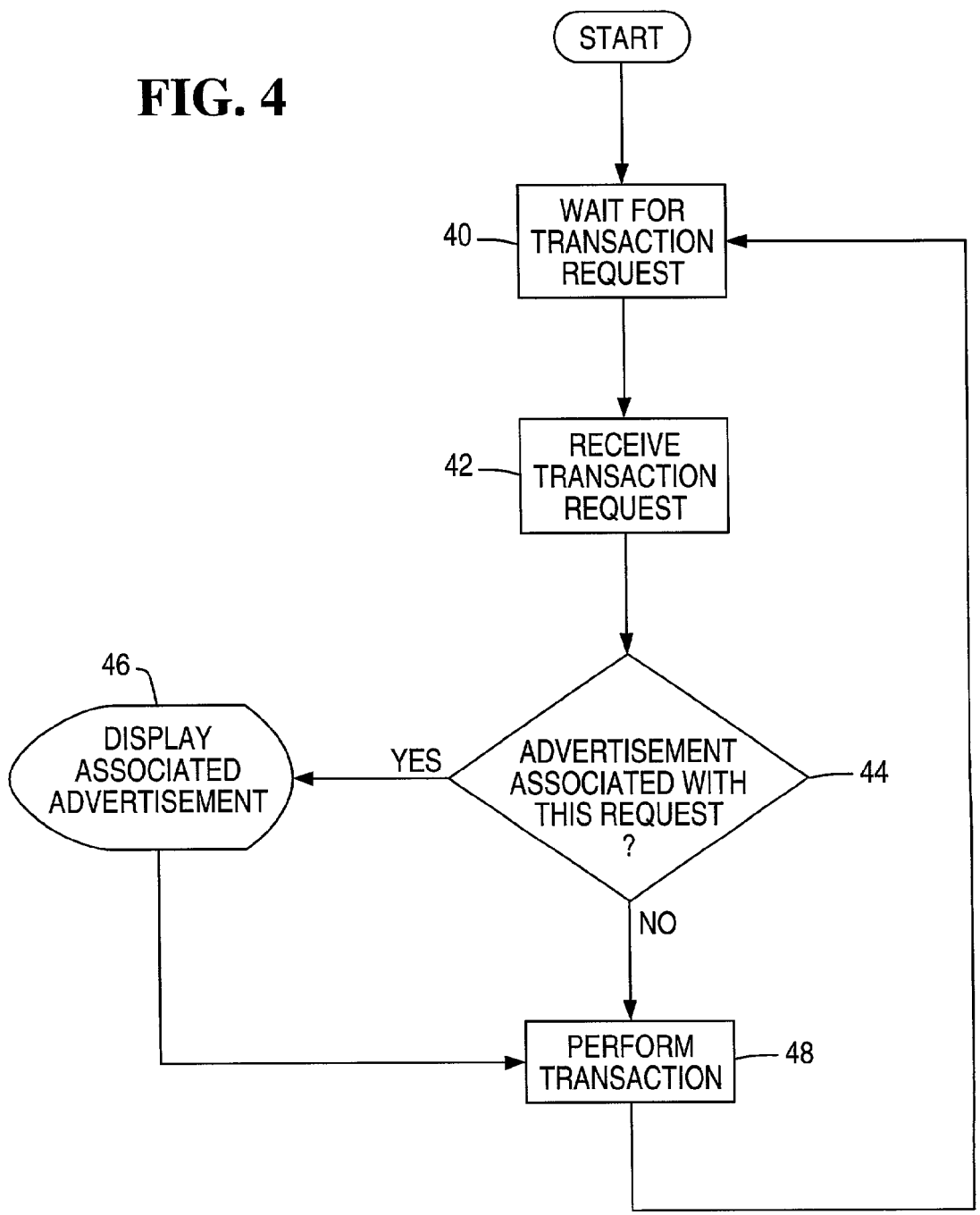
FIG. 4 is a flow chart showing the operation of an ATM in accordance with the invention.

With reference to FIG. 4, an ATM terminal waits for a transaction request (step 40).

A transaction request is received (step 42) and the downloaded mapping table is interrogated (step 44) to check whether an advertisement is associated with the requested transaction. If an advertisement is associated with the transaction then that advertisement is displayed (step 46).

The transaction is then performed (step 48) and the ATM loops back to wait for another transaction.

Figure 5:
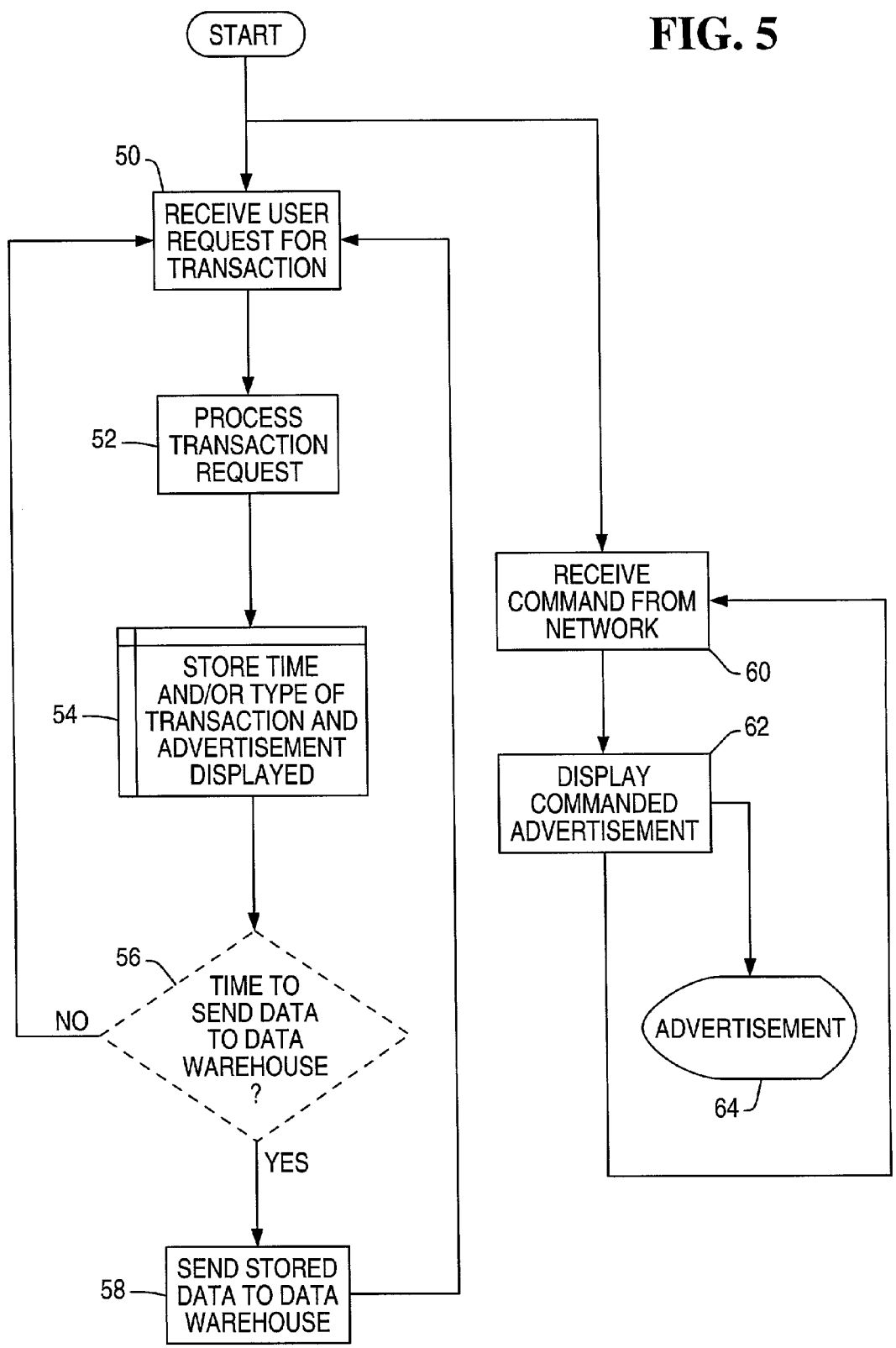
FIG. 5 is a flow chart showing operation of an ATM in a further preferred embodiment of the invention.

FIG. 5 shows the data gathering/collecting steps which are typically performed by an ATM terminal.

In step 50 the ATM received a user request for a transaction. The ATM processes the transaction request (step 52) and then stores internally, the time and/or type of transaction and optionally the advertisement displayed before, during and/or after the transaction is initiated (step 54).

In optional step 56, the terminal determines whether it is due to make a periodic dialup connection to the processor 16 in order to upload the stored transaction information generated in step 54. This step is optional, because some ATMs may be permanently connected to the processor 16 in which case the ATM proceeds immediately to step 58 to send the stored dated to the data warehouse 18 via the processor 16. This process thereby provides the information collected in step 30 of FIG. 3.

Also, the ATM receives commands from the ATM network issued by the processor 16 (step 60) to display particular advertisements (step 62 and 64). It will be appreciated that the command received in step 60 is that issued in step 36 of FIG. 3.

Thus the configuration and processes explained in detail above, allow an ATM deployer to provide detailed information about the operation of the fleet of ATMs under its control. This information in particular is of use to a sales force wishing to sell advertising space on ATM terminals to generate revenue.

This will become increasingly important as the menu of possible transactions which can be performed by an ATM terminal increases. New transactions will bring new usage patterns which in turn, will provide opportunities for different types of advertising to be placed. The invention described above allows the impact of these new types of advertising and the new types of usage patterns to be carefully analyzed in order not to confuse or upset customers and also in order to ensure that advertising is optimized both in terms of its duration and timing and its focus on appropriate customers.

Thus an ATM deployer can approach businesses wishing to advertise on its ATMs and provide detailed information about where its ATMs are located and what type of users use those ATMs. Furthermore, once an advertisement has been placed, the deployer is able to show the effect of the advertisement.

For example, an ATM terminal which is operable to print a map giving directions to a first event may during map printing or at other selected times display an advertisement related to an event run by the same company as the company which runs the first event. This type of linked advertising is difficult to implement and difficult to test using prior art manual surveying techniques. Furthermore, the printing of maps or other generally non financial-based transaction is a new area for which market research and advertising data is not available. The invention above rapidly provides such data and in real time or near real time.

What is claimed is:

1. A method of a computer selecting advertisements for display on or adjacent to a plurality of self-service terminals comprising the steps of:
   (a) collecting environment data related to the environment of each terminal including the nature of businesses nearby the terminal;
   (b) collecting transaction data indicating the type and time of transactions carried out at the terminal;
   (c) storing the collected data in a data warehouse;
   (d) collecting advertising data which describes the type and content of one or more advertisement displayed on or adjacent to the terminal at particular times;
   (e) querying the data warehouse to determine which terminals are located on sites at which a selected business activity is carried out; and
   (f) selecting an advertisement for display which includes content related to that business activity.

2. A method of a computer selecting advertisements for display on or adjacent to a plurality of self-service terminals comprising the steps of:
   (a) collecting environment data related to the environment of each terminal including the nature of businesses nearby the terminal;

(b) collecting transaction data indicating the type and time of transactions carried out at the terminal;
(c) storing the collected data in a data warehouse;
(d) collecting advertising data which describes the type and content of one or more advertisement displayed on or adjacent to the terminal at particular times;
(e) querying the data warehouse to calculate a statistical distribution of the frequency of different transactions occurring at a terminal; and
(f) selecting an advertisement for display at the terminal dependent on the statistical distribution.

3. A method of a computer selecting advertisements for display on or adjacent to a plurality of self-service terminals comprising the steps of:
(a) collecting environment data related to the environment of each terminal including the nature of businesses nearby the terminal;
(b) collecting advertising data related to the type and content of one or more advertisement displayed on or adjacent to the terminal at particular times;
(c) storing the collected data in a data warehouse;
(d) querying the data warehouse to determine which terminals are located on sites at which a selected business activity is carried out; and
(e) selecting an advertisement for display which includes content related to that business activity.

4. A method of a computer selecting advertisements for display on or adjacent to a plurality of self-service terminals comprising the steps of:
(a) collecting environment data related to the environment of each terminal including the nature of businesses nearby the terminal;
(b) collecting advertising data related to the type and content of one or more advertisement displayed on or adjacent to the terminal at particular times;
(c) storing the collected data in a data warehouse;
(d) querying the data warehouse to calculate a statistical distribution of the frequency of different transactions occurring at a terminal; and
(e) selecting an advertisement for display at the terminal dependent on the statistical distribution.

5. A data warehouse operable to receive data from a network of self-service terminals comprising:
means for holding environment data related to the environment of each terminal including its location and the nature of a business nearby the terminal;
means for holding transaction data indicating the type and time of transactions carried out at the terminal;
the data warehouse being operable to provide information in real time or near real time for selecting advertisements for display on or adjacent to one or more of the plurality of self-service terminals; and
means for determining which terminals are located on or within a predetermined distance of sites at which a selected business activity is carried out.

6. A data warehouse operable to receive data from a network of self-service terminals comprising:
means for holding environment data related to the environment of each terminal including its location and the nature of a business nearby the terminal;
means for holding transaction data indicating the type and time of transactions carried out at the terminal;
the data warehouse being operable to provide information in real time or near real time for selecting advertisements for display on or adjacent to one or more of the plurality of self-service terminals;
means for holding advertising data indicating the type and content of one or more advertisement displayed on and/or adjacent to the terminal at particular times; and
means for calculating a statistical distribution of the frequency of different transactions occurring at a terminal and selecting an advertisement for display at the terminal dependent on the statistical distribution.

7. A data warehouse operable to receive data from a network of self-service terminals comprising:
means for holding environment data which describes the environment of each terminal including data indicating its location or the nature of a business nearby the terminal;
means for holding advertising data related to the type and content of one or more advertisement displayed on the terminal or adjacent the terminal at particular times;
the data warehouse being operable to provide information in real time or near real time for selecting advertisements for display on or adjacent to one or more of the plurality of self-service terminals; and
means for determining which terminals are located on or within a predetermined distance of sites at which a selected business activity is carried out.

8. A data warehouse operable to receive data from a network of self-service terminals comprising:
means for holding environment data which describes the environment of each terminal including data indicating its location or the nature of a business nearby the terminal;
means for holding advertising data related to the type and content of one or more advertisement displayed on the terminal or adjacent the terminal at particular times;
the data warehouse being operable to provide information in real time or near real time for selecting advertisements for display on or adjacent to one or more of the plurality of self-service terminals; and
means for calculating a statistical distribution of the frequency of different transactions occurring at a terminal and selecting an advertisement for display at the terminal dependent on the statistical distribution.

* * * * *